US 6,658,565 B1

(12) United States Patent
Gupta et al.

(10) Patent No.: US 6,658,565 B1
(45) Date of Patent: Dec. 2, 2003

(54) DISTRIBUTED FILTERING AND MONITORING SYSTEM FOR A COMPUTER INTERNETWORK

(75) Inventors: Amit Gupta, Fremont, CA (US); Radia Joy Perlman, Acton, MA (US); Dah-Ming Chiu, Acton, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/088,348

(22) Filed: Jun. 1, 1998

(51) Int. Cl.[7] .................................................. H04L 9/00
(52) U.S. Cl. ........................................ 713/153; 713/168
(58) Field of Search ................................ 370/389, 392, 370/393, 230–235, 252, 400, 351, 352, 357; 713/153, 154, 160, 176, 161, 200, 168, 201; 709/105, 223–235, 237, 238, 244

(56) References Cited

U.S. PATENT DOCUMENTS

| | | | | |
|---|---|---|---|---|
| 4,621,359 A | | 11/1986 | McMillen ...................... 370/60 |
| 5,455,865 A | * | 10/1995 | Perlman ....................... 380/49 |
| 5,495,426 A | * | 2/1996 | Waclawsky et al. ......... 370/389 |
| 5,511,122 A | | 4/1996 | Atkinson ...................... 380/25 |
| 5,850,449 A | * | 12/1998 | McManis .................... 713/162 |
| 5,892,754 A | * | 4/1999 | Kompella et al. .......... 370/252 |
| 6,009,528 A | * | 12/1999 | Teraoka ....................... 713/201 |
| 6,055,236 A | * | 4/2000 | Nessett et al. .............. 370/389 |
| 6,092,191 A | * | 7/2000 | Shimbo et al. ............. 713/153 |
| 6,111,877 A | * | 8/2000 | Wilford et al. ............. 370/392 |
| 6,128,644 A | * | 10/2000 | Nozaki ....................... 709/203 |
| 6,173,364 B1 | * | 1/2001 | Zenchelsky et al. ........ 711/118 |
| 6,229,806 B1 | * | 5/2001 | Lockhart et al. ............ 370/389 |

FOREIGN PATENT DOCUMENTS

| | | |
|---|---|---|
| EP | 0 776 112 A | 5/1997 |
| GB | 2 301 919 | 12/1996 |

* cited by examiner

*Primary Examiner*—Melvin Marcelo
*Assistant Examiner*—Andy Lee
(74) *Attorney, Agent, or Firm*—Cesari and McKenna, LLP

(57) ABSTRACT

A system efficiently distributes processing-intensive loads among a plurality of intermediate stations in a computer internetwork. The intermediate stations include routers, bridges, switches and/or firewalls configured with monitoring and filtering agents that communicate via a defined protocol to implement the system. Those stations configured with agents and having available resources cooperate to execute the loads which generally comprise verification operations on digital signatures appended to frame and/or packet traffic traversing paths of the computer internetwork. Techniques associated with the system are directed to efficiently detecting and filtering unauthorized traffic over portions of the internetwork protected as trust domains as well as unprotected portions of the internetwork.

26 Claims, 6 Drawing Sheets

US 6,658,565 B1

DISTRIBUTED FILTERING AND MONITORING SYSTEM FOR A COMPUTER INTERNETWORK

FIELD OF THE INVENTION

The present invention relates generally to computer networks and, more specifically, to a technique for distributing processing loads among intermediate stations of a computer internetwork.

BACKGROUND OF THE INVENTION

Communication in a computer internetwork involves the exchange of data between two or more entities interconnected by communication media. The entities are typically software programs executing on hardware computer platforms, such as end stations and intermediate stations. In particular, communication software executing on the stations correlate and manage data communication with other stations. The stations typically communicate by exchanging discrete packets or frames of data according to predefined protocols. A protocol, in this context, consists of a set of rules defining how the stations interact with each other.

Examples of intermediate stations include a router, a switch and a bridge, each of which generally comprises a processor. such as a central processing unit (CPU), and port interfaces for interconnecting a wide range of communication links and subnetworks. Broadly stated, the router implements network services such as route processing, path determination and path switching functions. The route processing function determines optimal routing for a packet based, e.g., on a destination address stored in a packet header, such as an Internet protocol (IP) header, whereas the path switching function allows a router to accept a packet on one interface and forward it on a second interface. The path determination, or forwarding decision, function selects the most appropriate interface for forwarding a packet. The switch, on the other hand, provides the basic functions of a bridge including filtering of data traffic by medium access control (MAC) address and "learing" of a MAC address based upon a source MAC address of a frame; in addition, the switch may implement forwarding decision and path switching operations of a router.

Often it may be desirable for the intermediate station, hereinafter referred to as a switch, to perform additional processing-intensive operations on a stream of data traffic. An example of such processing may involve policing of bandwidth utilization policies, such as usage parameter control or network parameter control policies. Violations of these policies typically occur when a transmitting station ("sender") attempts to utilize more bandwidth than it is entitled to under the terms of the policies. Hence, it may be desired to have the switch record, e.g., all frame traffic of a particular type and within a particular time span that are transmitted from a particular sender to ensure that the sender does not exceed a particular threshold (e.g., 5 frames a second). Enforcement of the policies results in the switch discarding (filtering) those frames in violation of the bandwidth constraints. However, the accounting, auditing and/or record keeping operations needed to ensure that the bandwidth constraints are observed may tax the CPU resources of the switch.

Another example of desired processing-intensive operations for a switch involves checking for invalid digital signatures on packets received at the switch. Digital signatures are generally used in accordance with a well-known cryptographic technique for performing remote authentication known as public key cryptography. In this method of secure communication, each entity has a public encryption key and a private encryption key, and two entities can communicate knowing only each other's public keys and, of course, their own private keys. To prove to a recipient of information that the sender is who it purports to be, the sender digitally encodes ("signs") the information with its private key. If the recipient can decode ("verify") the information, it knows that the sender has correctly identified itself.

It may be desirable for the switch to check digital signatures on packets to verify that the packets orginate from a sender that is authorized to use the bandwidth of the network. Here, the authorized senders have access to a group private key and the switch has access to, or aquires, the complementary group public key. The authorized senders thus sign their packets with the group private key and the switch verifies those signatures upon receiving the packets. Those packets having unauthorized signatures may be filtered by the switch.

However, it typically takes longer for a switch to verify a signature than it takes to receive a small packet at wire speed, so an unauthorized sender could mount a "denial-of-service" attack by transmitting a stream of invalidly signed packets. Such an attack becomes particularly burdensome when the switch attempts to verify digital signatures on multicast packets. Checking of each packet at the switch consumes valuable CPU resources which typically cannot be spared because of their occupation with conventional switching operations. Each switch is generally independently responsible for verifying packets of a traffic stream and, as such, a single switch may be unable to keep up with the traffic of such an attack. Therefore, the present invention is directed to alleviating the processing-intensive burden placed on a switch of a computer internetwork.

SUMMARY OF THE INVENTION

The invention relates to a load distribution system for efficiently distributing processing-intensive loads among a plurality of intermediate stations in a computer internetwork. The intermediate stations include routers, bridges and/or switches configured with monitoring and filtering agents that communicate via a defined protocol to implement the system. According to the invention, those stations configured with agents and having available resources cooperate to execute the loads which generally comprise verification operations on digital signatures appended to frame and/or packet traffic traversing paths of the computer internetwork. The novel system includes various techniques that are directed to efficiently detecting and filtering unauthorized traffic, hereinafter referred to as packets, over portions of the internetwork protected as trust domains as well as unprotected portions of the internetwork, such as the Internet.

In a first technique of the inventive system, multiple switches share the verification load by independently processing a random selection of packets. Most senders of packets generally do not transmit unauthorized packets over the internetwork; therefore, rather than process (check) each packet, the first technique employs a plurality of switches to "spot-check" a fraction of the packets. Notably, there is no need to coordinate processing among the switches. A second technique, however, contemplates examination of each packet, but in a manner that avoids redundancy. A hash function is invoked to assign packet checking responsibility to each switch configured with the monitoring and filtering agent. Communication among the agents resident on switches of a path traversed by the packets enables distinguishing of responsibility based on, e.g., even/odd destination addresses of the packets.

If apportioning of the processing load according to the second technique results in unbalanced division of work among the switches, a sophisticated hash function is employed that divides the packets into substantially more "buckets" than the previous hash function. According to this third inventive technique, each switch is assigned an equal number of buckets and if any switch is burdened with excessive processing responsibility, additional buckets are exchanged among the switches.

In a trust domain, an enterprise trusts only those switches within its domain, yet packets are often exchanged with an "outside" network, such as the Internet. A fourth technique of the inventive load distribution system specifies the use of a flag in the header of the packet to indicate whether the packet has been verified by a trusted switch. The flag may be contained with an unused field of the header or, alternatively, it may be part of a mini-header added to the packet for use within the trust domain.

A fifth technique is directed to changing the fraction of packets that are "spot-checked" on a per flow basis. A flow is a function of information stored in a packet header such as, in the case of an Internet protocol (IP) packet, source and destination IP address, source and destination transmission control protocol (TCP) ports and flow label. This aspect of the invention may be advantageously employed with the first technique such that once an unauthorized packet is identified via random spot-checking, a more careful examination of the source stream is conducted. Various approaches to changing the fraction of packets that are spot-checked for each flow are described further herein.

A sixth technique of the inventive system is directed to distributed filtering of packets using non-optimal routing. Since there may be only certain switches in the internetwork configured with the agents, this technique specifies changing an optimal path taken by a packet so it traverses switches having packet-verification capability.

Advantageously, the invention described herein distributes data traffic processing loads among intermediate stations of a computer internetwork in an efficient manner. More specifically, the invention provides a distributed filtering mechanism configured to avoid "denial-of-service" attacks on a switch of a computer internetwork.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
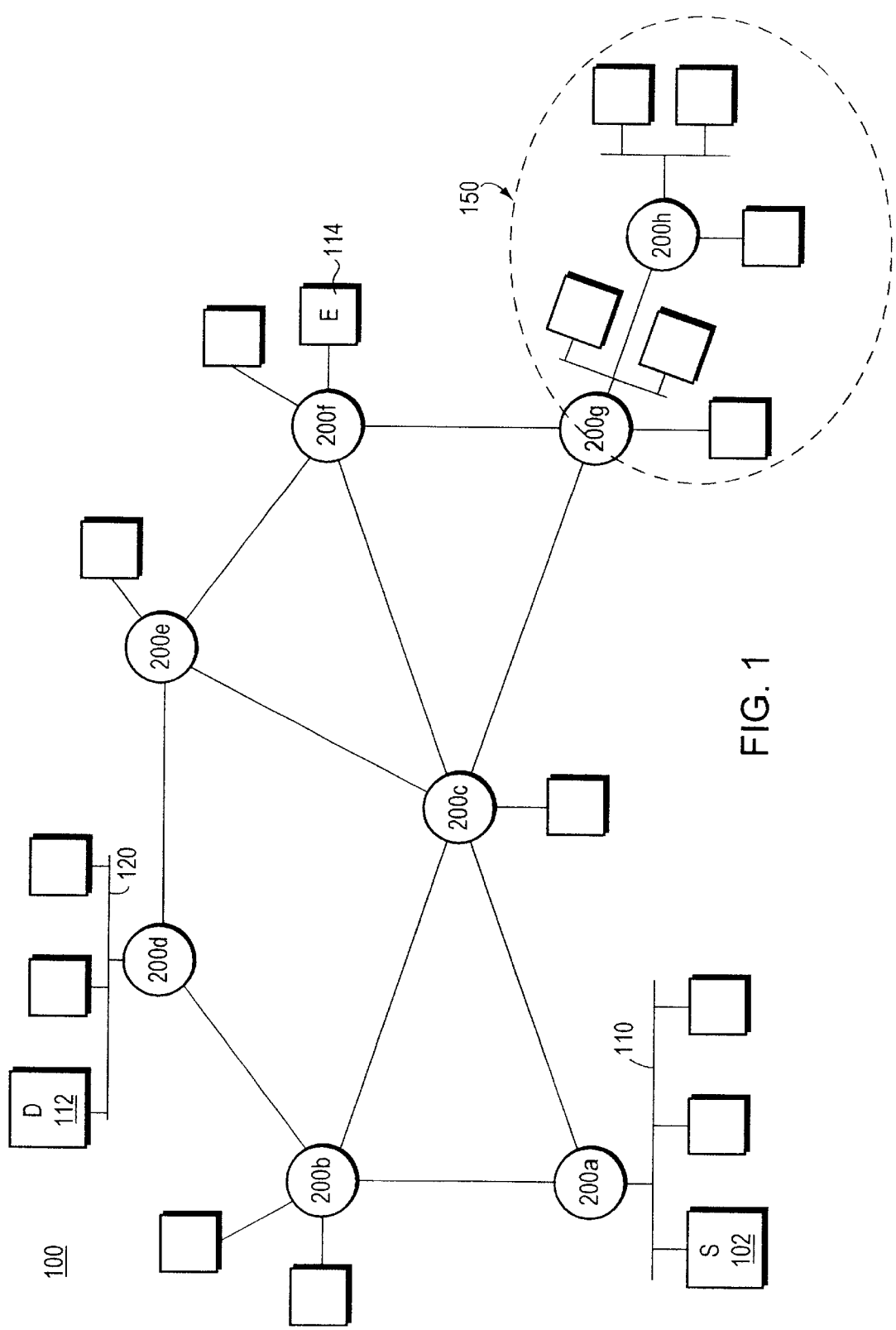
FIG. 1 is a schematic block diagram of a computer internetwork comprising a collection of interconnected communication media attached to a plurality of stations, including intermediate stations.

FIG. 1 is a schematic block diagram of a computer internetwork 100 comprising a collection of interconnected communication media attached to a plurality of stations. The communication media may be configured as local area networks (LANs) 110 and 120, although other media configurations such as point-to-point network links may be advantageously employed. The stations are typically computers comprising source (S) and destination (D) end stations 102, 112, such as personal computers or workstations, and intermediate stations 200a–h such as routers, bridges, switches and/or firewalls. Communication among the stations is typically effected by exchanging discrete data frames or packets between the communicating nodes according to a predefined protocol, such as the is Internet protocol (IP), Internet Packet Exchange protocol, AppleTalk protocol or DECNet protocol.

Figure 2:
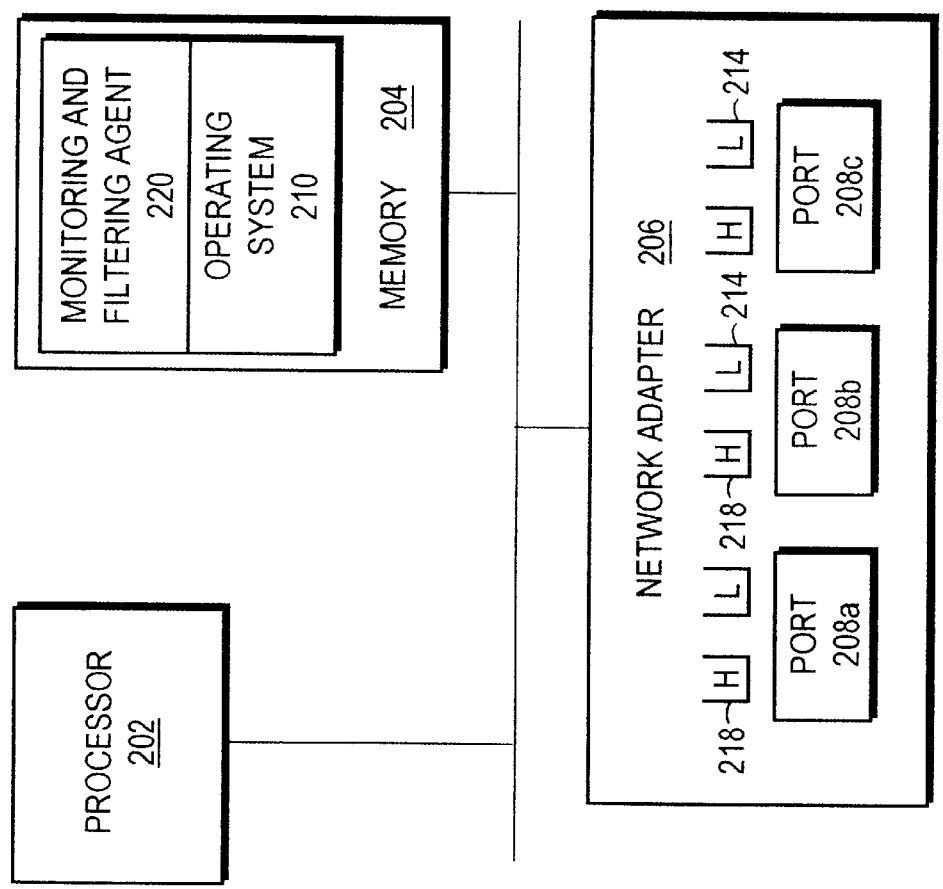
FIG. 2 is a schematic block diagram of an intermediate station, such as a network switch, configured to operate in accordance with a load distribution system for efficiently distributing processing-intensive loads among similarly-configured switches of the computer internetwork of FIG. 1.

FIG. 2 is a schematic block diagram of an intermediate station, hereinafter to referred to as a switch 200, configured to operate in accordance with the invention, although it should be noted that other intermediate stations, such as a router or bridge, may be advantageously used with the present invention. The switch generally comprises a plurality of interconnected elements, such as a processor 202, a memory 204 and a network adapter 206 having a plurality of port interfaces 208a–c. The memory may comprise storage locations addressable by the processor and adapter for storing software programs and data structures associated with the inventive load distribution techniques. The processor is typically a central processing unit (CPU), although it may generally comprise processing elements or logic configured to execute the software programs and manipulate the data structures. It will be apparent to those skilled in the art that other processor and memory means, including various computer readable media, may be used for storing and executing program instructions pertaining to the techniques described herein.

An operating system 210, portions of which are typically resident in memory and executed by the CPU, functionally organizes the station by, inter alia, invoking network operations in support of software processes executing on the station. An example of such a software process is a conventional monitoring and filtering agent 220 that configures the switch for communication with agents of similarly-configured switches to thereby enable implementation of the inventive load distribution system described herein. Preferably, the filtering agents communicate via a conventional network management protocol, such as a Simple Network Management Protocol (SNMP).

The inventive load distribution system efficiently distributes processing-intensive loads among a plurality of switches configured with the monitoring and filtering agents. Specifically, those switches configured with the agents and having available CPU resources cooperate to execute the loads which generally comprise verification operations on digital signatures appended to frame and/or packet traffic traversing paths of the computer internetwork. To that end, the novel system includes various techniques that are directed to efficiently detecting and filtering unauthorized traffic, hereinafter referred to as packets, over portions of the internetwork protected as trust domains as well as unprotected portions of the internetwork, such as the Internet.

According to a first technique, multiple switches share the verification load by independently processing a random selection of packets. Most senders of packets generally do not transmit unauthorized packets over the internetwork; therefore, rather than process (check) each packet, the first technique employs a plurality of switches to "spot-check" a fraction of the packets. Notably, there is no need to coordinate processing among the switches.

For example refer to FIG. 1 wherein two switches 200a,b of a computed path are dynamically assigned monitoring and verification responsibilities. If each of the switches randomly check 1/n of the packet traffic, then only 1/**2 packets are checked twice. If n is reasonably large (e.g., 5 or more) then collectively the switches check roughly 2/n of the packets. This technique provides a probabilistic approach where there is no requirement to process each packet, but where there is some value associated with checking occasional packets.

According to a second technique of the system, a hash function is invoked by the switch to assign packet-checking responsibility among switches configured to operate in accordance with the invention. Here, each packet is examined by the switches and assigned to a responsible switch based on a hash of the packet in a manner that avoids redundancy. A hash is a function that generally reduces a large quantity to smaller quantities of "buckets" that requires considerably less CPU resources to compute than digital signature verification. In general, any field/aspect of a packet can be hashed if it facilitates distinguishing the packets.

Figure 3:
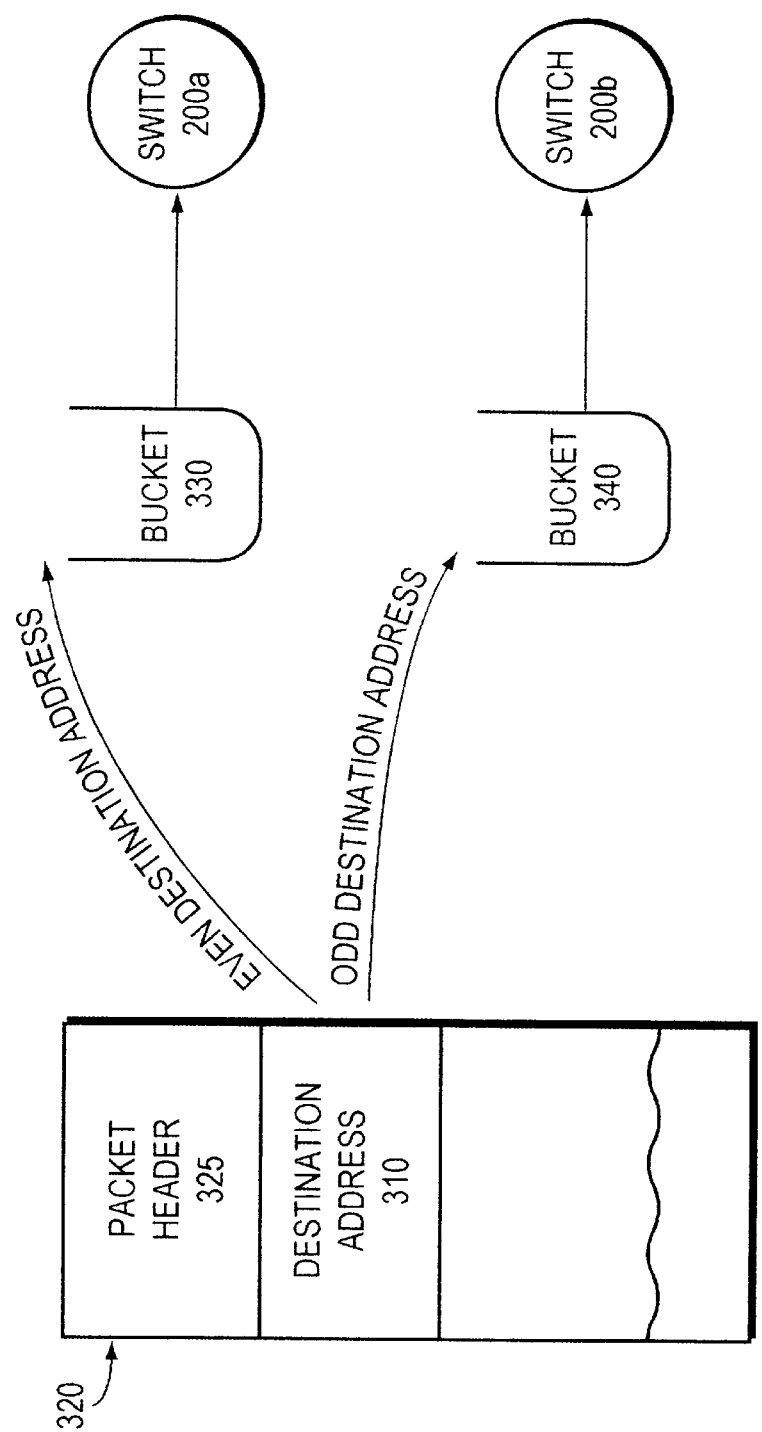
FIG. 3 is a schematic diagram illustrating a hash function technique for use in accordance with the inventive load distribution system.

For example, agents 220 resident on switches 200a,b of a path traversed by the packets communicate to distinguish responsibility based on addresses of the packets. FIG. 3 is a schematic diagram illustrating a reasonable hash function 300 based on a destination address 310 of a header 325 of packet 320. According to the technique, all even destination addresses are assigned to bucket 330 and all odd destination addresses are assigned to bucket 340. Thereafter, each bucket is assigned to a respective switch 200a,b. Another example of a reasonable hash function relates to distinguishing data packets by even/odd sequence numbers.

If apportioning of the processing load according to the second technique results in unbalanced division of work among the switches because, e.g., there are substantially more even addresses than there are odd addresses, a more sophisticated hash function may be employed that divides the packets into substantially more buckets than the previous hash function. According to this third inventive technique, each switch is assigned an equal number of buckets and if any switch is burdened with excessive processing responsibility, additional buckets are exchanged among the switches.

Figure 4:
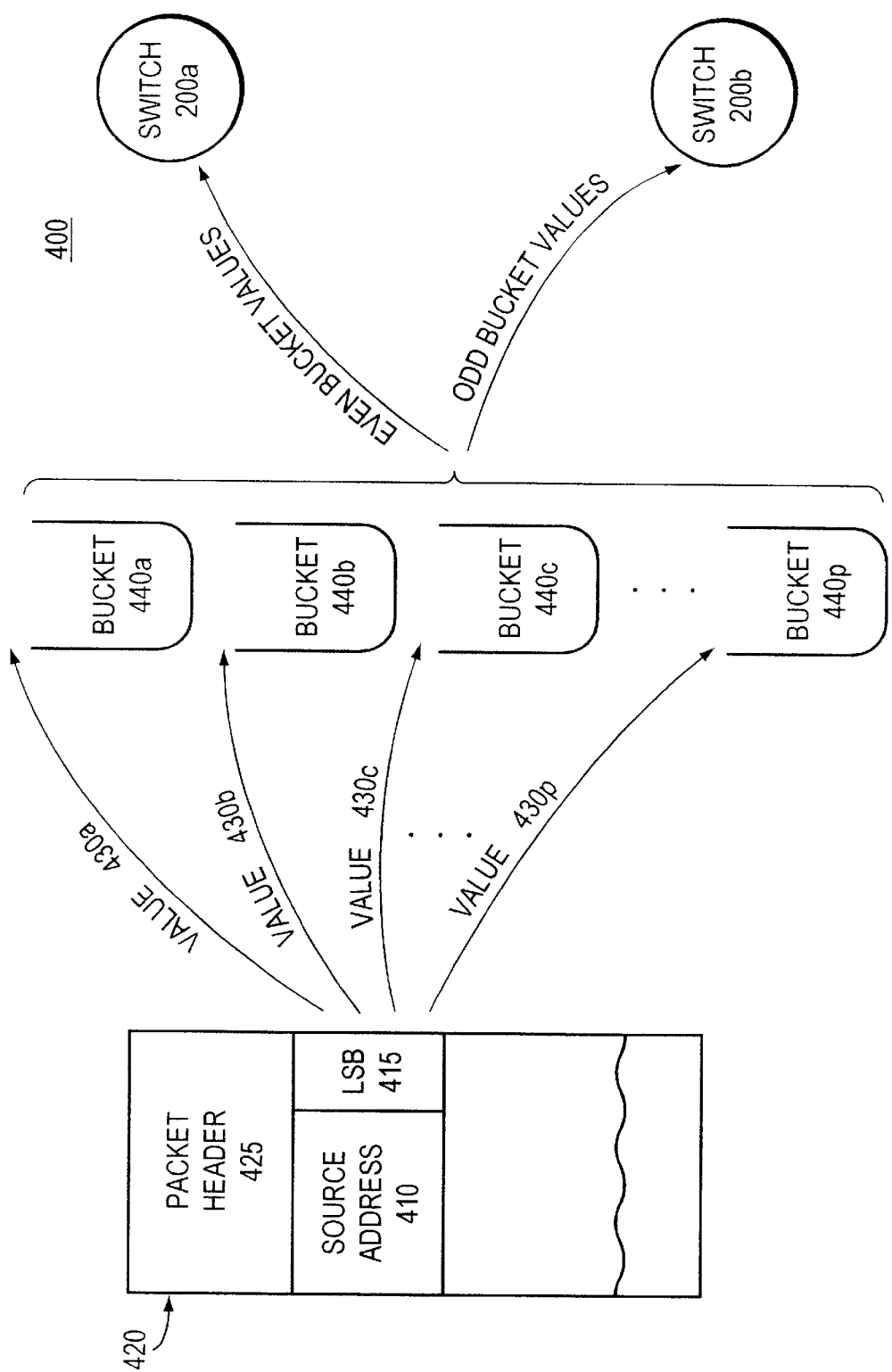
FIG. 4 is a schematic diagram illustrating a more sophisticated hash function technique for use in accordance with the inventive load distribution system.

FIG. 4 is a schematic diagram of an example of such a hash function 400 involving use of, e.g., four (4) least significant bits (LSB 415) of a source address 410 of a packet 420. These LSBs translate into sixteen (16) different values 430a–p, each of which is assigned to a bucket 440a–p. The packets are then apportioned among the switches 200a,b based on, e.g., even/odd bucket values. If it turns out that more packets are processed by the switch assigned the even values or if the switch assigned the odd values has additional CPU. capacity, then the latter switch can be assigned additional packets, such as ones with, the values 4 and 12. It is apparent that more than 16 buckets may be realized by employing additional LSBs and, of course, the same technique could apply to most significant bits of the packets or, for that matter, anything that divides the packets into buckets. This technique thus enables even distribution of the load or, alternatively, intentional uneven distributions thereof, if necessary, among the switches.

Essentially, .this third hash function technique represents a multi-level approach wherein the load is initially divided by a predetermined criterion obtained as a result of decoding predetermined address bits (first level) and then, if it is apparent over a period of time that this initial apportionment is ineffective, a second level is invoked to balance the load based on such empirical data. For example as traffic characteristics of packet transmission over the network change, distribution of the load may also change.

Figure 5A:
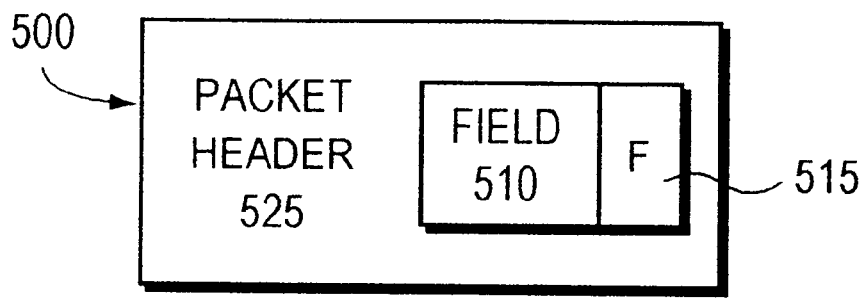
FIGS. 5A and 5B are schematic diagrams illustrating a trusted flag technique for use in accordance with the inventive load distribution system.
Figure 5B:
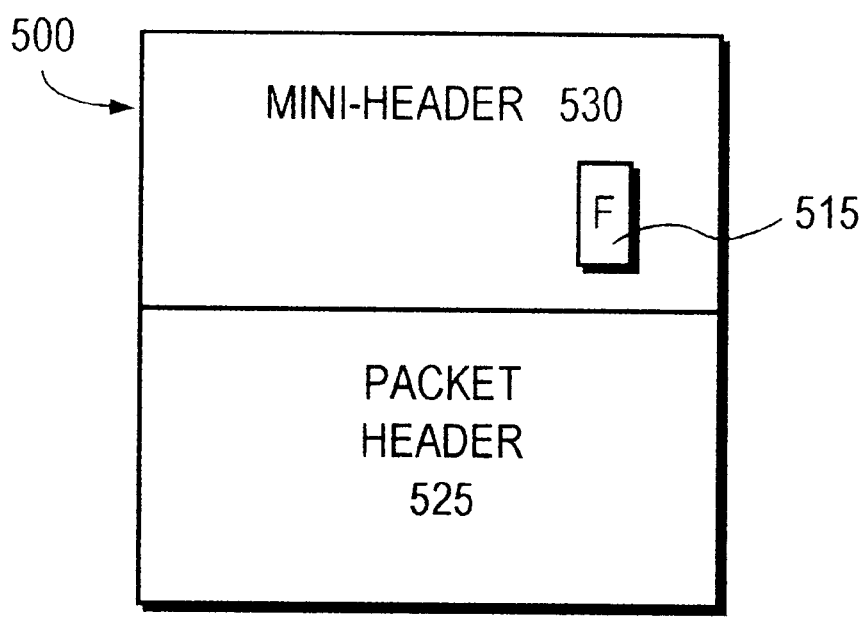

Often a portion of the internetwork is protected as a trust domain, an example of which may be a corporate intranet of a particular enterprise which is schematically shown as domain 150 in FIG. 1. Typically, the enterprise trusts only those switches within its domain, yet packets are usually exchanged between the trust domain 150 and an "outside" network, such as the Internet, through a switch 200g configured as a firewall. FIGS. 5A and 5B are schematic diagrams illustrating a fourth technique of the inventive load distribution system wherein a flag (F) 515 in a header of a packet 500 is used to indicate whether the packet has been verified by a trusted switch 200g,h. According to the inventive technique, the flag 515 may be contained with an unused field 510 of the header or, alternatively, it may be part of a mini-header 530 added to the packet 500 for use within the trust domain.

For most protocols, there are spare bits in the header that are not generally used, such as the bits contained in a "type of service" field on an IPv6 header. Within a trust domain 150, one of these unused bits can be designated as the flag for use by the trusted switches 200g,h according to an algorithm of the present invention. That is, the flag 515 is defined as initialized to zero so that when a packet 500 is received at the firewall 200g from the Internet, the firewall ensures that the flag is cleared; this indicates that the packet was received from outside the trust domain and that it has yet to be checked by a trusted switch. Even if the packet was checked prior to traversing the firewall, the flag 515 is cleared because the enterprise does not trust any switch outside of the trust domain to perform the verification operations.

If there are no spare bits in the packet header 525, the firewall may alternately add a mini-header 530 to the packet for use within the trust domain to carry the flag. Mini-headers are often appended to packets, such as in the case of virtual local area networks (VLANs) and tag switching. The appended mini-header has a length of at least one bit is for indicating packet verification (or lack thereof) by a trusted switch.

Thus, according to the fourth technique, each incoming packet received at the trust domain 150 from outside of that domain is marked indicating whether the packet needs to be checked by a trusted switch. For example, setting of the flag denotes that no other switch need examine the packet. Any switch within the trust domain configured to check packets and having available CPU capacity may examine the packet and thereafter set the flag indicating that it has been verified.

This aspect of the inventive technique allows "upstream" switches to check unverified packets depending upon their available capacity (and time), while allowing "downstream" switches having such available capacities to process any remaining unverified packets.

Moreover, use of the "trusted flag" technique may obviate the need for the second and third techniques described herein because a trusted switch configured with the present invention will perform a packet verification procedure only if it has available resources. The fourth technique may be used, however, with the first random checking technique where the need to verify a packet is evident from the state of the defined flag 515. In other words, marking the packets according to the fourth technique is useful in connection with the first technique to eliminate duplicate packet checking, but it is not generally useful with the second or third techniques because the switches have been assigned responsibility for certain packets.

Figure 6:
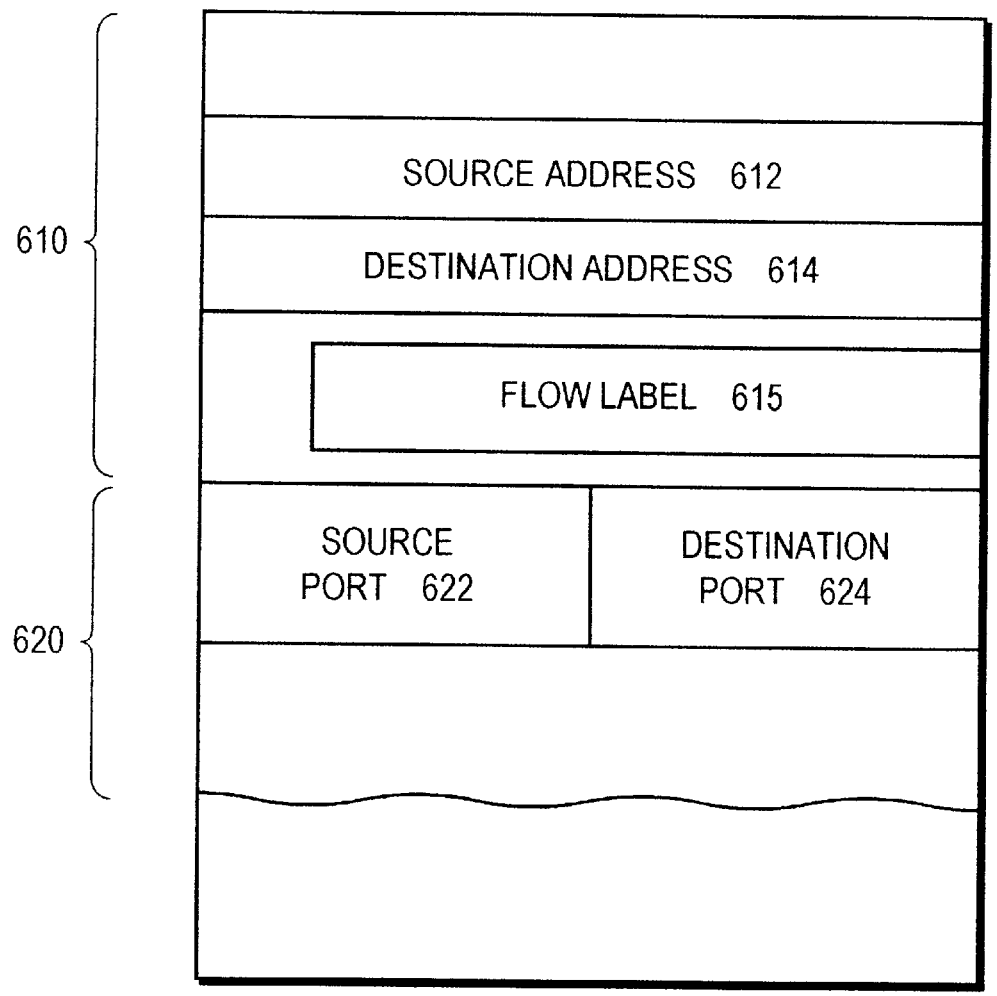
FIG. 6 is a schematic diagram illustrating a flow altering technique for use in accordance with the inventive load distribution system.

FIG. 6 is a schematic diagram illustrating a fifth technique of the invention wherein a fraction of packets that are spot-checked may be altered on a per flow basis. A flow is a function of information stored in a header of a packet; in the case of a transmission control protocol/Internet protocol (TCP/IP) packet, 600, the flow may comprise source and destination addresses 612, 614 of an IP header 610, source and destination ports 622, 624 of a TCP header 620 and a flow label 615, which is a 28-bit field of an IPv6 packet header. This "flow" technique may be advantageously employed with the first technique described herein such that once an unauthorized packet is identified via random spot-checking, a more careful examination of the source stream is conducted. Various approaches to changing the fraction of packets that are spot-checked for each flow are described further herein.

Specifically, a fraction (e.g., one out of every thousand) of the packets received from a particular source (identified by an address prefix of a particular address block) is initially checked and as long as no unauthorized packets are identified, the fractional spot-checking ratio is maintained. Yet once an unauthorized packet is identified from that source, a more careful examination of the stream is conducted. For example, if an unauthorized packet is discovered having a source prefix 685*, it is assumed that a sender at 685* is attempting to use bandwidth on the network in violation of a prescribed policy. Accordingly, this aspect of the load distribution system provides, a number of approaches to changing the fraction of packets that are spot-checked for each flow.

(a) The switch can be manually configured to check a certain (probably increased) fraction of packets based on a particular flow. For example, for packets having particular destination port 624 or a particular prefix of a source address 612, check fifty percent of the packets rather than one percent.

(b) Initially only a small fraction of packets (e.g., one out of every thousand) is checked but once a packet with a particular flow is identified as having an unauthorized signature on it, a larger fraction of packets with that flow is thereafter checked by the switch. Note that for this approach, the switch that notices the problem changes the fraction itself.

(c) This approach is generally the same as (b) except that the switch is informed of the unauthorized packet by a trusted switch or a system administrator.

(d) Although the switch does not find any unauthorized packets, it does detect a change in the traffic pattern, e.g., a significant increase in packet transfer rate from a particular source. This may be an indication that a sender is attempting to attack the network by inserting a plurality of unauthorized packets into a stream. The switch thus increases the fraction of packets that are inspected based on a particular flow.

A sixth technique of the invention is directed to distributed filtering of packets using non-optimal routing. If there are only certain switches configured with agents that are capable of checking packets, this technique specifies changing the optimal path calculated for a packet so that it will traverse switches that have packet-verification capabilities. For example and referring to FIG. 1, assume a minimal path to destination 112 from end station (E) 114 encompasses switches 200f,e,d; however none of these switches are capable of examining a packet to verify an appended digital signature. Therefore, according to this inventive technique, the packet is forwarded along a non-optimal path that includes switches 200b,c, each of which is configured to check the packet.

In the case of a connection-oriented network, such as an ATM network where virtual circuits are established, there may be two different virtual circuits to a destination: one representing the shortest path but which encompasses no additional switches capable of packet-verification processing and another that, although non-optimal, includes switches that can process the packet. If a particular switch has the resources (time or capacity) to process the packet, it checks the packet and if verified, sends it over the minimal path. If the switch does not have the resources to process the packet, it sends the packet over the non-optimal path in hopes that a. downstream switch will check and verify it.

For a connectionless network, each switch sends the packet to a neighbor. In the case of an IP packet, each switch forwards the packet to a next hop and the next hop makes an independent decision as to the direction of the packet. That is, the next hop could decide that another switch having the capability of checking for unauthorized packets should be included in the path, even though that path is not the optimal route to the destination.

While there has been shown and described an illustrative embodiment for efficiently distributing processing-intensive loads among a plurality of intermediate stations in a computer internetwork, it is to be understood that various other adaptations and modifications may be made within the spirit and scope of the invention. For example, in an alternative embodiment of the fourth inventive technique, unverified packet traffic may be treated as lower priority than verified packet traffic. Recall that a reason for checking the digital signatures of the packets is to ensure that unauthorized packets do not consume bandwidth in the network. When an unauthorized packet is identified, it is discarded. There may be a situation where the trusted switches do not have the resources (capacity and/or time) to check all of the packets. Those packets that have been checked are, according to this alternate embodiment, distinguished with an asserted predetermined flag 515 and are treated as high priority packets.

Specifically, if firewall 200g at an entry point of the trust domain 150 cannot keep up with the incoming traffic, the interior trusted switches 200h need not verify any unverified packets, but rather may choose to treat those packets as low priority. That is, those packets that are verified are placed on high priority queues (H 218 of FIG. 2) within a switch 200 and the unverified packets are placed on low priority queues (L 214). The low priority packets are then prone to "dropping" (discarding) if the trusted region exceeds a certain bandwidth utilization. Thus even though there is not enough CPU capacity to check all the packets; there is still some benefit to checking a fraction of the packets.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for efficiently distributing processing-intensive loads among a plurality of intermediate stations in a computer internetwork, the method comprising the steps of:
    configuring at least one intermediate station with a monitoring and filtering agent process to execute the loads on packet traversing paths of the computer internetwork; and
    at the configured intermediate station, independently processing a random selection of packets according to a fractional spot-checking function to thereby share the loads among the intermediate stations, to process verification operations on digital signatures appended to the packets.

2. The method of claim 1 wherein the selection of packets processed by the configured intermediate station is selected by said intermediate station according to a hash function.

3. The method of claim 2 further comprising the step of invoking the hash function to distinguish the packets based on contents of a field of each packet.

4. The method of claim 3 further comprising the steps of, wherein the contents comprise a destination address:
    apportioning the packets according to even and odd destination addresses; and
    selecting packets having even destination addresses by one intermediate station and selecting packets having odd destination addresses by another intermediate station.

5. The method of claim 3 further comprising the steps of, wherein the contents comprise a sequence number:
    apportioning the packets according to even and odd sequence numbers; and
    selecting packets having even sequence numbers by one intermediate station and selecting packets having odd sequence numbers by another intermediate station.

6. The method of claim 3 further comprising the steps of, wherein the contents comprise an address:
    decoding predetermined address bits into distinct values;
    apportioning the packets according to the distinct values;
    selecting packets by the intermediate stations based on the distinct values; and
    reassigning, by communicating between the intermediate stations, to reassign corresponding packets to others of the intermediate stations to thereby balance the load among the stations.

7. The method of claim 1 further comprising the steps of, wherein processing of the loads comprises verification operations on digital signatures appended to the packets:
    in response to identifying an unauthorized packet by a particular intermediate station, filtering the unauthorized packets; and
    altering the random fractional spot-checking of packets by said particular intermediate station on a per flow bases, wherein a flow comprises source and destination addresses, source and destination ports and a flow label of a packet.

8. The method of claim 7 wherein the step of altering comprises the step of spot-checking an increased fraction of the packets.

9. The method of claim 7 wherein the step of altering comprises the step of manually configuring the particular intermediate station to spot-check an increased fraction of the packets based on the flow.

10. The method of claim 1 further comprising the step of, wherein the data traffic comprises packets:
    in response to identifying a change in traffic pattern, altering the random fractional spot-checking of packets by each intermediate station on a per flow basis, wherein a flow comprises source and destination addresses, source and destination ports and a flow label of a packet.

11. The method of claim 1 further comprising the step of, wherein a portion of the internetwork is protected as a trusted domain having trusted switches:
    employing a flag within a header of a packet to indicate whether the packet has been verified by a trusted switch configured with the monitoring and filtering agent.

12. The method of claim 11 wherein the flag may be contained within one of an unused field of the header and a mini-header appended to the packet.

13. The method of claim 12 further comprising the step of, if a state of the flag indicates that the packet has not been verified by an upstream trusted switch along a path of the computer internetwork:
    enabling a downstream trusted switch to process the unverified packet depending upon its available capacity.

14. The method of claim 1, further comprising the steps of:
    calculating an optimal path for the packets over the computer internetwork;
    determining whether intermediate stations located along the optimal path are configured with the monitoring and filtering agents; and
    changing the optimal path of the packets to a non-optimal path that includes additional intermediate stations configured with the monitoring and filtering agents to execute the verification operations on the packets.

15. The method of claim 1 wherein the intermediate station comprises at least one of a switch, a router, a bridge and a firewall.

16. The method of claim 2 wherein the intermediate station comprises at least one of a switch, a router, a bridge, and a firewall.

17. A computer readable medium containing executable program instructions for efficiently distributing processing-intensive loads directed to verification operations on digital signatures appended to packets transferred among a plurality of intermediate stations in a computer internetwork, the executable program instructions comprising program instructions for:
    configuring at least one intermediate station with a monitoring and filtering agent process to execute the loads on the packets traversing paths of the computer internetwork; and
    at the configured intermediate station, independently processing a selection of the packets assigned to the station according to a hash function that enables checking of the digital signatures to identify one of authorized and unauthorized packets, thereby enabling sharing of the loads among the intermediate stations.

18. The computer readable medium of claim 17 wherein said executable program instructions further comprise program instructions for invoking the hash function to distinguish the packets based on contents of a field of each packet.

19. The computer readable medium of claim 18 wherein said executable program instructions further comprise program instructions for, wherein the contents comprise an address:

decoding predetermined address bits into distinct values;

apportioning the packets according to the distinct values;

assigning packets to the intermediate stations based on the distinct values; and reassigning certain of the previously-assigned packets to certain of the intermediate stations to thereby balance the load among the stations.

20. A computer data signal embodied in a carrier wave and representing sequences of instructions for efficiently distributing processing-intensive loads directed to verification operations on digital signatures appended to packets transferred among a plurality of intermediate stations in a computer internetwork, the instructions comprising instructions for:

configuring at least one intermediate station with a monitoring and filtering agent process to execute the loads on the packets traversing paths of the computer inter-network; and at the configured intermediate station, independently processing a selection of the packets assigned to the station according to a hash function that enables checking of the digital signatures to identify one of authorized and unauthorized packets, thereby enabling sharing of the loads among the intermediate stations.

21. The computer data signal of claim 20 wherein the selection of packets processed by each intermediate station is randomly assigned according to a fractional spot-checking function, said fractional spot checking function selecting a predetermined fraction of packets for processing, to enable checking of the digital signatures to identify one of authorized and unauthorized packets.

22. The computer data signal of claim 21 wherein the instructions further comprise instructions for:

in response to identifying an unauthorized packet by a particular intermediate station, filtering the unauthorized packet; and altering the random fractional spot-checking of packets by the particular intermediate station on a per flow basis.

23. The computer data signal of claim 22 wherein the instructions for altering further comprise instructions for spot-checking an increased fraction of the packets.

24. A system for efficiently distributing processing-intensive loads among a plurality of intermediate stations in a computer internetwork, the system comprising:

a plurality of memory devices containing software programs organized as monitoring and filtering agents to execute the loads on packets traversing paths of the computer inter-network, a portion of the internetwork protected as a trust domain having trusted switches;

a plurality of processing elements coupled to respective ones of the memory devices, each processing element configured to execute a respective agent to independently verify digital signatures appended to a selection of packets to thereby share the loads among the intermediate stations; and a flag structure contained within a header of a packet to indicate whether the packet has been verified by a trusted switch configured with the monitoring and filtering agent.

25. The system of claim 24 wherein the flag structure may be contained within one of an unused field of the header and a mini-header appended to the packet.

26. The system of claim 25 wherein the intermediate station comprises one of a switch and a router.

\* \* \* \* \*